(12) United States Patent
Abo et al.

(10) Patent No.: US 6,502,541 B2
(45) Date of Patent: Jan. 7, 2003

(54) CONTROL SYSTEM FOR DIRECT FUEL INJECTION ENGINE

(75) Inventors: Matsuharu Abo, Hitachinnaka (JP); Yoshiyuki Tanabe, Hitachinaka (JP); Koji Onishi, Hitachinaka (JP); Toshio Ishii, Mito (JP); Hiroshi Fujii, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/941,653

(22) Filed: Aug. 30, 2001

(65) Prior Publication Data

US 2002/0112692 A1 Aug. 22, 2002

(30) Foreign Application Priority Data

Feb. 21, 2001 (JP) ........................................ 2001-044978

(51) Int. Cl.[7] .............................................. F02B 17/00
(52) U.S. Cl. ....................................... 123/295; 123/305
(58) Field of Search ................................ 123/295, 302, 123/305, 301, 300, 294

(56) References Cited

U.S. PATENT DOCUMENTS

| | | | | |
|---|---|---|---|---|
| 5,709,190 A | * | 1/1998 | Suzuki | 123/302 |
| 5,870,993 A | * | 2/1999 | Stellet et al. | 123/308 |
| 5,908,018 A | * | 6/1999 | Suzuki | 123/301 |
| 5,967,114 A | * | 10/1999 | Yasoka | 123/295 |

FOREIGN PATENT DOCUMENTS

| | | |
|---|---|---|
| JP | 10205362 | 8/1998 |
| JP | 11294207 | 10/1999 |

* cited by examiner

*Primary Examiner*—Bibhu Mohanty
(74) *Attorney, Agent, or Firm*—Crowell & Moring LLP

(57) ABSTRACT

The invention provide a control system for a direct fuel injection engine employing a valve varying mechanism, which can suppress mixing of burned gas and fresh air to maintain the combustion stability, can accelerate vaporization of sprayed fuel at the beginning of fuel injection to reduce the emission rate of HC, and can realize a reduction of NOx based on the effect of exhaust return. The control system for the direct fuel injection engine comprises a fuel injector. for directly injecting fuel into a combustion chamber, and valve varying drivers for variably controlling the opening/closing timing of each of an intake valve and/or an exhaust valve. A control unit controls the valve varying mechanism unit to introduce burned gas from an exhaust port into the combustion chamber and to inject the fuel during a compression stroke for effectuating stratified charge combustion. The control unit controls the valve varying drivers to provide a phase difference in the opening timing of two left and right valves constituting the intake valve and/or the exhaust valve, thereby generating a flow of the burned gas along a cylinder wall.

9 Claims, 15 Drawing Sheets

CONTROL SYSTEM FOR DIRECT FUEL INJECTION ENGINE

BACKGROUND OF THE INVENTION

1. Field of the Invention

The present invention relates to a direct fuel injection engine control system for controlling a direct fuel injection engine in which fuel is directly injected into a combustion chamber. More particularly, the present invention relates to a direct fuel injection engine control system suitable for controlling a direct fuel injection engine that includes a valve varying mechanism for introducing burned gas into a cylinder.

2. Description of the Related Art

JP,A 10-205362, for example, discloses one control system for a conventional direct fuel injection engine. This disclosed system includes a valve varying mechanism for varying an overlap between intake and exhaust so that burned gas in an exhaust port is introduced to a combustion chamber. The temperature in a cylinder is thereby increased to accelerate vaporization of injected fuel for reducing HC (hydrocarbon). The disclosed system is further intended to reduce NOx (nitrogen oxides) based on the effect of exhaust return. According to another known control system disclosed in JP,A 11-294207, for example, a valve varying mechanism is operated to maintain an intake valve on one side closed during the intake stroke and keeps an exhaust valve on one side open during the intake stroke so that a combustion gas area is produced substantially in a half of a cylinder.

However, the control system disclosed in JP,A 10-205362 has the following problems. Because a swirl flow is formed in the combustion chamber by a swirl valve, the burned gas introduced from the exhaust port is forced to spread in the cylinder by a strong swirl flow and to mix with fresh air. Therefore, combustion stability is reduced in an operating range under low load. Further, because this related art is intended to raise the temperature in the entirety of the cylinder, the effect of accelerating fuel vaporization at a spray tip of the injected fuel is low, although the fuel vaporization at the spray tip greatly contributes to a reduction of HC.

Also, the control system disclosed in JP,A 11-294207 has the following problems. Because fuel is injected toward fresh air to improve combustion stability, restrictions occur in arrangement of a fuel injector and direction of fuel injection. Further, because a fuel spray is locally formed in one side of the cylinder, it is apt to reach a cylinder wall more quickly. Therefore, the emission rate of HC is increased at the injection timing near the compression top dead center at which a sufficient vaporization time cannot be obtained.

SUMMARY OF THE INVENTION

Accordingly, it is an object of the present invention to provide a control system for a direct fuel injection engine employing a valve varying mechanism, which can suppress mixing of burned gas and fresh air to maintain the combustion stability, can accelerate vaporization of sprayed fuel at the beginning of fuel injection to reduce the emission rate of HC, and can realize a reduction of NOx based on the effect of exhaust return.

(1) To achieve the above object, the present invention provides a control system for a direct fuel injection engine comprising a fuel injector for directly injecting fuel into a combustion chamber, and a valve varying mechanism unit for variably controlling the opening/closing timing of each of an intake valve and/or an exhaust valve, the valve varying mechanism unit being operated to introduce burned gas from an exhaust port into the combustion chamber and to inject the fuel during a compression stroke for effectuating stratified charge combustion, wherein the valve varying mechanism unit is controlled to provide a phase difference in the opening timing of two left and right valves constituting the intake valve and/or the exhaust valve, thereby generating a flow of the burned gas along a cylinder wall.

With those features, mixing of burned gas and fresh air can be suppressed, and therefore the combustion stability can be maintained. Vaporization of sprayed fuel at the beginning of fuel injection can be accelerated, and therefore the emission rate of HC can be reduced. Further, a reduction of NOx can be realized based on the effect of exhaust return.

(2) In above (1), preferably, the valve varying mechanism unit controls a valve overlap between the intake valve and the exhaust valve by varying the opening/closing timing of one of two left and right valves constituting the intake valve, and/or varying the opening/closing timing of one of two left and right valves constituting the exhaust valve.

(3) In above (1), preferably, the valve varying mechanism unit controls a valve overlap between the intake valve and the exhaust valve by providing a phase difference in the opening timing between two left and right valves constituting the intake valve beforehand, providing a phase difference in the opening timing between two left and right valves constituting the exhaust valve beforehand, and varying the opening/closing timing of the intake valve and the exhaust valve.

(4) In above (1), preferably, the valve varying mechanism unit varies the opening/closing timing of one of two left and right valves constituting the intake valve to increase a valve overlap between the intake valve and the exhaust valve, and then holds one of two left and right valves constituting the exhaust valve to be open during a period in which the intake valve is opened, thereby increasing the amount of burned gas introduced.

(5) In above (1), preferably, a valve overlap between the intake valve and the exhaust valve is controlled by varying the opening/closing timing of one of two left and right valves constituting the intake valve, and/or increasing a valve lift of the exhaust valve.

(6) In above (1), preferably, the fuel injector is a high-penetrating injector for injecting the fuel in a spray form with initial spraying or deflected spraying or spray-lead spraying.

(7) In above (6), preferably, the fuel injector injects the fuel twice in the operation with stratified charge combustion.

(8) In above (1), preferably, the control system for the direct fuel injection engine further comprises a piston having a recess formed in a crown surface of the piston to maintain a tumble flow during the compression stroke, and having a swirl guide formed therein on the exhaust side opposite to the recess.

(9) In above (1), preferably, the injecting direction of the fuel injector is aligned with the direction of the burned gas flow along the cylinder wall.

BRIEF DESCRIPTION OF THE DRAWINGS

FIGS. 5A and 5B show the construction of a high-penetrating injector with initial spraying, which is employed in the direct fuel injection engine for use with the first embodiment of the present invention, in which FIG. 5A is a front view and FIG. 5B is an enlarged sectional view of a principal part of FIG. 5A;

FIGS. 15A, 15B and 15C are explanatory views showing the construction of the high-penetrating injector of the spray lead type, which is employed in the direct fuel injection engine for use with the first embodiment of the present invention, in which FIG. 15A is a front view, FIG. 15B is an enlarged sectional view of a principal part of FIG. 15A, and FIG. 15C is a bottom view of the principal part of FIG. 15B;

DESCRIPTION OF THE PREFERRED EMBODIMENTS

The construction and operation of a control system for a direct fuel injection engine according to a first embodiment of the present invention will be described below with reference to FIGS. 1 to 17.

A description is first made of the construction of a direct fuel injection engine of the spray lead type, as one direct fuel injection engine for use with the first embodiment of the present invention.

Figure 1:
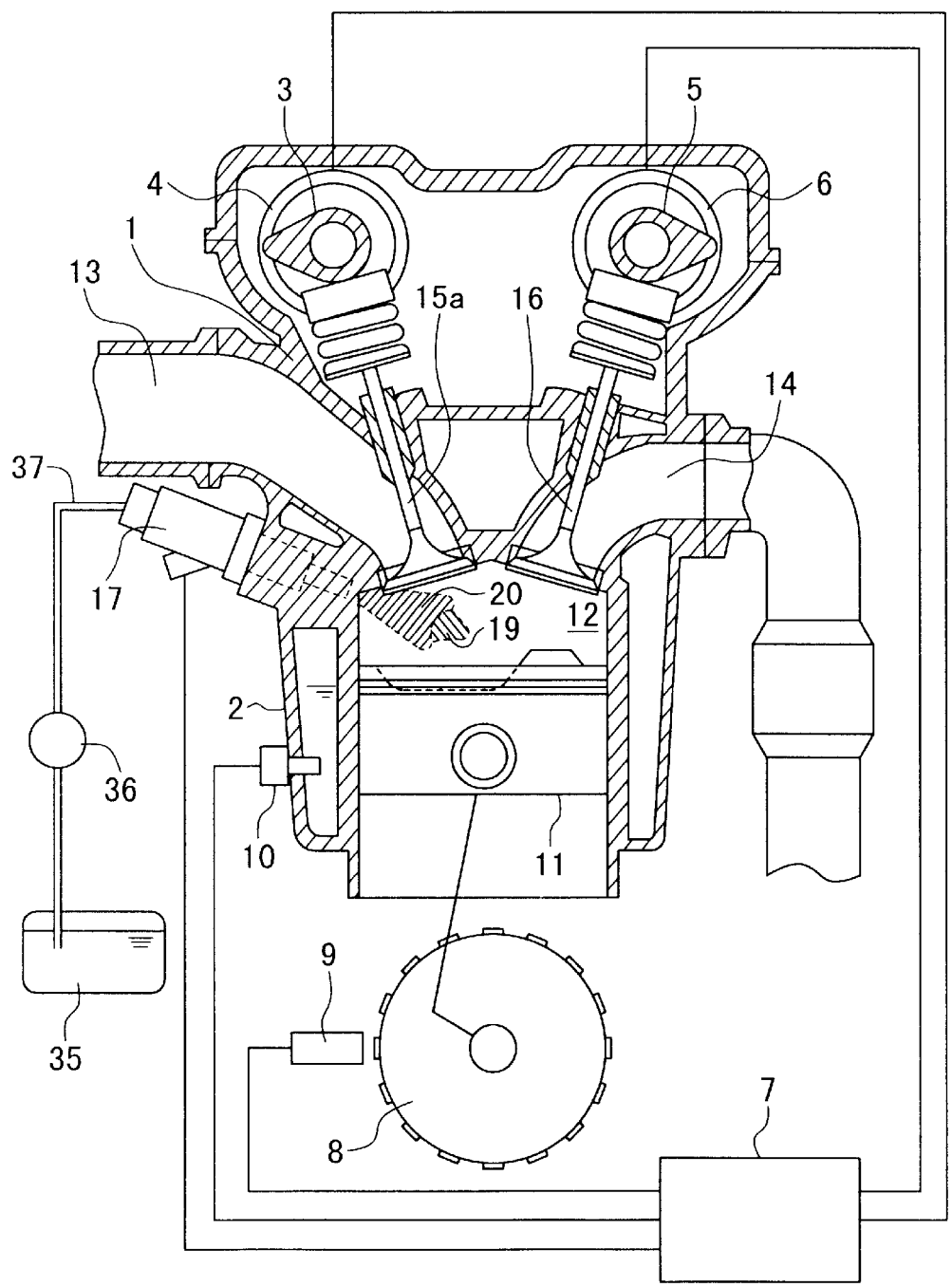
FIG. 1 is a vertical sectional view, taken along a plane passing an axis of an intake pipe, of a direct fuel injection engine for use with a first embodiment of the present invention.
Figure 2:
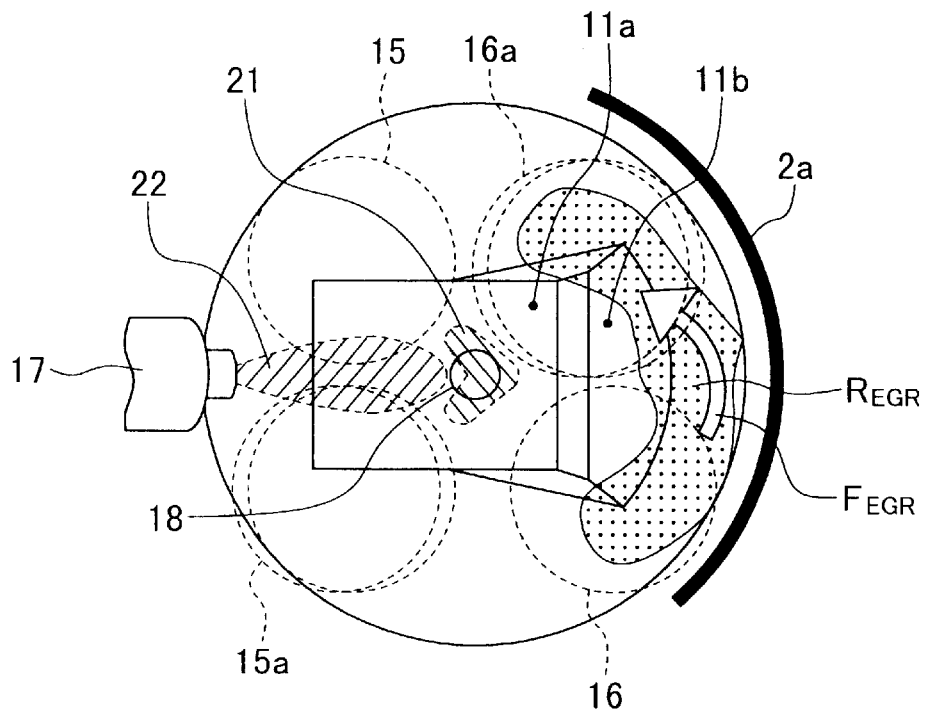
FIG. 2 is a plan view of a cylinder of the direct fuel injection engine for use with the first embodiment of the present invention.

FIG. 1 is a vertical sectional view, taken along a plane passing an axis of an intake pipe, of the direct fuel injection engine for use with the first embodiment of the present invention, and FIG. 2 is a plan view of a cylinder of the direct fuel injection engine for use with the first embodiment of the present invention.

The engine construction will first be described with reference to FIG. 1. A combustion chamber 12 is defined by a cylinder head 1, a cylinder block 2, and a piston 11 inserted in the cylinder block 2. The combustion chamber 12 is provided in any desired number to form a single or a plurality of cylinders. An intake port 13 and an exhaust port 14 are connected to the combustion chamber 12 constituting one cylinder. An intake valve 15a is provided at an opening of the intake port 13 communicating with the combustion chamber 12 to open and close the intake port 13. An exhaust valve 16 is provided at an opening of the exhaust port 14 communicating with the combustion chamber 12 to open and close the exhaust port 14. In this embodiment, as shown in FIG. 2, two intake ports 13 are provided for one combustion chamber 12, and therefore two intake valves 15, 15a are provided. Similarly, as shown in FIG. 2, two exhaust ports 14 are provided for one combustion chamber 12, and therefore two exhaust valves 16, 16a are provided.

The intake valve 15a is connected to and driven by an intake camshaft 3 through a rocker arm or a lifter. The intake camshaft 3 is connected to an intake valve varying driver 4 for variable control of the open timing of the intake valve 15a. Though not specifically shown, the intake valve varying driver 4 includes a valve timing varying mechanism of twisting the camshaft or shifting a cam lobe, for example, so that a cam working angle of the intake camshaft 3 can be changed. Similarly, the intake valve 15, shown in FIG. 2, is connected to an intake valve varying driver through an intake camshaft. Further, the exhaust valve 16 is connected to an exhaust valve varying driver 6 through an exhaust camshaft 5. Similarly, the exhaust valve 16a, shown in FIG. 2, is connected to an exhaust valve varying driver through an exhaust camshaft. The above description is primarily applied to the construction of a 4-valve engine. For a 3-valve engine including one exhaust valve, a valve lift varying mechanism for varying a valve lift may be used instead of the valve timing varying mechanism for varying the timing at which the exhaust valve is opened and closed.

A high-penetrating injector 17 is provided on a sidewall of the combustion chamber 12 on the intake side, and a spark plug 18 is provided at the top of the combustion chamber 12. The construction of the high-penetrating injector 17 will be described later with reference to FIGS. 6 to 15. A fuel spray injected from the high-penetrating injector 17 has such a pattern that a lead spray 19 emitted at the beginning of fuel injection goes ahead and an ignition spray 20 follows the lead spray 19. Also, in the range of low revolution speed, fuel is injected twice in a divided manner. Thus, as shown in FIG. 2, a first spray 21 and a second spray 22 are injected. The fuel spray will be described later in detail with reference to FIG. 4.

Upstream of the high-penetrating injector 17, there are disposed a fuel tank 35 and a high-pressure fuel pump 36 for enabling fuel to be injected even in a condition where the interior of the combustion chamber 12 is under high pressure. These components 17, 36 and 45 are connected in series by fuel piping 37. A rotation sensor 9 for detecting a variation in rotation of a ring gear 8, which is rotated in sync with an engine crankshaft, is provided at any desired position of an engine crankcase.

A water temperature sensor 10 as one of temperature detecting means is disposed at any desired position of a cooling water passage, which is formed in the cylinder block 2, for determining the warm-up status of the engine.

As clearly shown in FIG. 2, one cylinder is provided with the two intake valves 15, 15a and the two exhaust valves 16, 16a. The spark plug 18 is disposed at the top center of the combustion chamber. The spark plug 18 is arranged on an imaginary line extended from an axis of the high-penetrating injector 17.

A control section for the direct fuel injection engine for use with this embodiment will be described below with reference to FIG. 1.

Output signals of various sensors, such as the rotation sensor 9, the water temperature sensor 10, and an air flow sensor (not shown), are inputted to a direct-injection engine controller (control unit) 7. Based on the input signals, the control unit 7 determines the warm-up status of the engine and the states of engine revolution speed and engine load, thereby determining whether the engine can be stably operated with stratified charge combustion. If the operation with stratified charge combustion can be performed, the control unit 7 executes various control programs, such as a fuel injection program, a rotation variation detecting program, a valve varying control program, for outputting driving signals to various actuators such as the high-penetrating injector 17, the intake valve varying driver 4, and the exhaust valve varying driver 5.

Herein, the intake and exhaust valve varying drivers 4, 5 are controlled such that the degree of internal EGR (Exhaust Gas Recirculation) is optimized by varying an overlap between the intake and exhaust valve while the control unit 7 makes determination in accordance with an internal EGR control map, which is installed therein, depending on the states of engine revolution speed and engine load.

The internal EGR and a flow of generated EGR gas in the direct fuel injection engine for use with this embodiment will be described below with reference to FIGS. 2 to 4.

Figure 3:
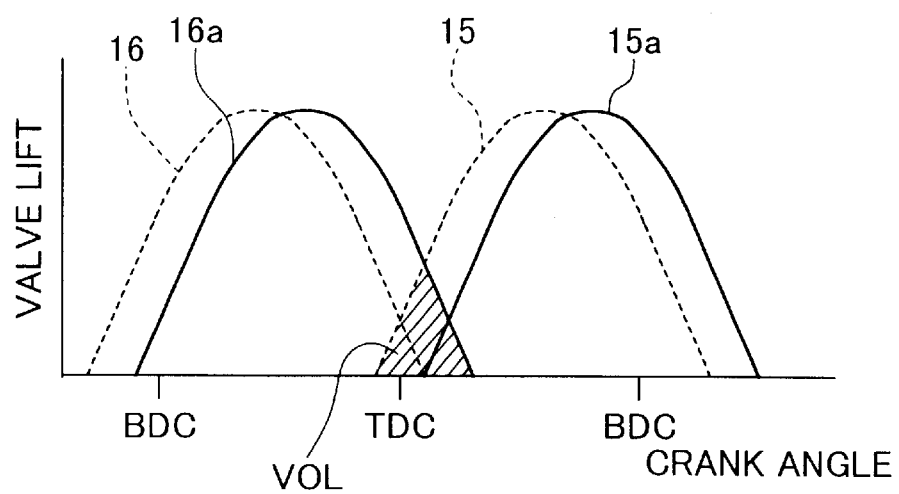
FIG. 3 is a chart for explaining the valve timing of intake and exhaust valves controlled by a control system for the direct fuel injection engine according to the first embodiment of the present invention.
Figure 4:
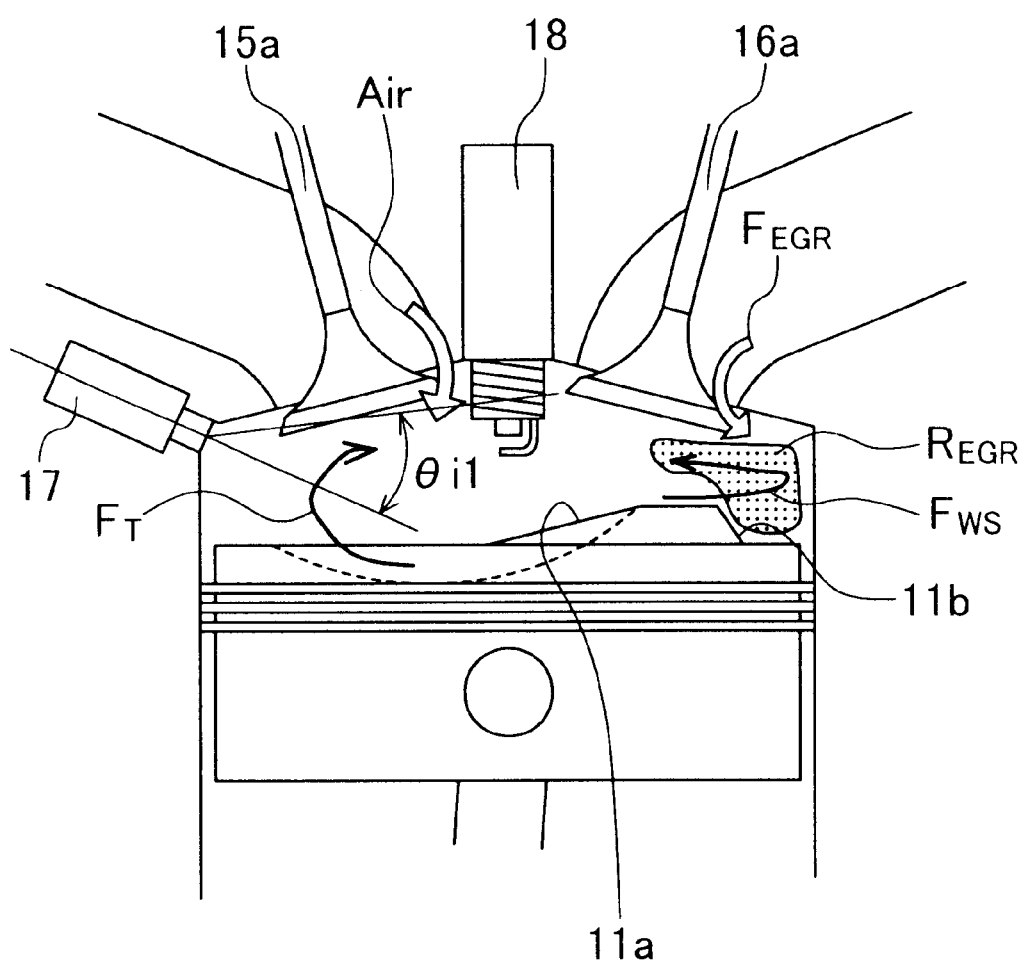
FIG. 4 is an explanatory view showing airflows in the intake stroke of the direct fuel injection engine for use with the first embodiment of the present invention.

FIG. 3 is a chart for explaining the valve timing of the intake and exhaust valves controlled by the control system for the direct fuel injection engine according to the first embodiment of the present invention, and FIG. 4 is an explanatory view showing airflows in the intake stroke of the direct fuel injection engine for use with the first embodiment of the present invention. The same characters in FIG. 4 as those in FIGS. 1 and 2 denote the same components.

As shown in FIG. 3, when the operating status is such that the operation with stratified charge combustion is feasible, the engine revolution speed is low, and the engine load is light, the control unit 7 controls the intake and exhaust valve varying drivers 4, 5 to delay the opening/closing timing of the exhaust valve 16a with respect to the opening/closing timing of the exhaust valve 16, and simultaneously delay the opening/closing timing of the intake valve 15a, which is positioned in a diagonal relation to the exhaust valve 16a, with respect to the opening/closing timing of the intake valve 15. A valve overlap VOL, indicated by a hatched area, is thereby enlarged between a pair of intake and exhaust valves. As a result, high-temperature burned gas on the exhaust port side is introduced to the cylinder during the intake stroke to effectuate the internal EGR.

In this embodiment, as shown in FIG. 4, the shape of the intake port is set such that sucked fresh air generates a tumble flow $F_T$ directing from the center of the piston toward the spark plug along the cylinder wall on which the fuel injector is disposed. A tumble guide groove 11a is provided in the crown surface of the piston to keep the tumble flow remaining during the compression stroke.

Another feature of this embodiment is that, as shown in FIG. 3, a phase difference is provided in the opening timing between two left and right intake valves, i.e., the intake valves 15, 15a arranged side by side, by delaying the opening/closing timing of the intake valve 15a with respect to the opening/closing timing of the intake valve 15. With such a phase difference in the opening timing between the intake valves 15, 15a, a weak swirl flow $F_{WS}$ is formed in the combustion chamber as shown in FIGS. 2 and 4. In the range of low revolution speed, a swirl component is relatively increased because the airflow in the cylinder is weakened. Further, as shown in FIG. 4, a swirl guide 11b is formed in the crown surface of the piston on the exhaust side in an opposed relation to the tumble guide groove 11a. Since the distance between the swirl guide 11b and the cylinder wall is substantially constant, a passage for the swirl flow $F_{WS}$ is formed between the swirl guide 11b and the cylinder wall. Accordingly, most of burned gas introduced from the side of the exhaust valve 16a during the intake stroke, as shown in FIG. 4, generates a flow (flow of EGR gas) $F_{EGR}$ along a cylinder wall 2a on the exhaust side, as shown in FIG. 2. Hence an EGR gas area $R_{EGR}$ is formed while it can be avoided from spreading.

With the above-described construction, the EGR gas mixes with fresh air AIR at a smaller rate, and the temperature near the cylinder wall on the exhaust side is more effectively increased. This is advantageous in accelerating vaporization of injected fuel.

The direction of the fuel spray injected from the high-penetrating injector 17 is appropriately set within the range of angle θi1 formed between the axis of the high-penetrating injector 17 and an imaginary line extended to pass the spark plug 18, as shown in FIG. 4, so that the fuel spray is directed toward the spark plug. With that arrangement, an air-fuel mixture is distributed with a higher density at the top of the combustion chamber, and improved robustness is obtained in combustion stability.

The high-penetrating injector 17 used in this embodiment is of the type carrying an injected fuel spray to the spark plug due to penetration of the spray itself. By using that type of valve, the operation with stratified charge combustion can be performed up to the range of higher revolution speed as compared with the so-called air guide type that carries a fuel spray with airflows, mainly comprising a swirl flow or a tumble flow, produced by an airflow generating mechanism provided in a conventional intake pipe. Specifically, it is confirmed by a bench engine experiment that the operation with stratified charge combustion can be performed until approximately 3200 r/min. The effect of further improvement in fuel economy is expected with a wider operating range in which the operation with stratified charge combustion is feasible. To that end, the fuel injector 17 is set to have strong spray penetration so that the fuel spray is stably carried to the spark plug even when the tumble flow is intensified in the range of high revolution speed. Such a fuel injector having strong spray penetration is called herein a high-penetrating injector.

Figures 5A, 5B:
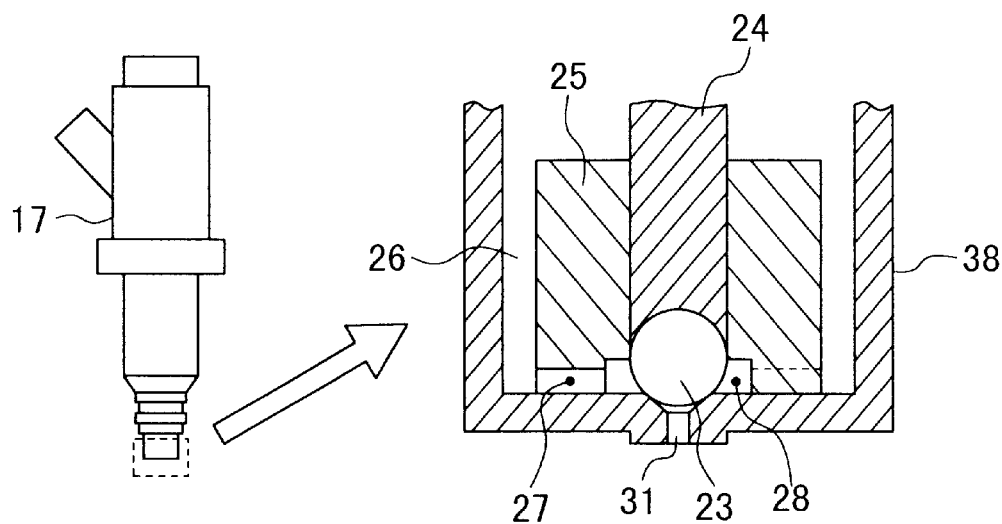
Figure 6:
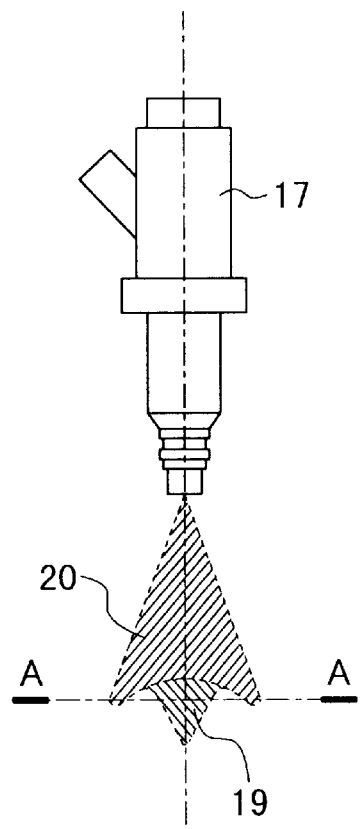
FIG. 6 is an explanatory view showing the pattern of a fuel spray formed by the high-penetrating injector with initial spraying, which is employed in the direct fuel injection engine for use with the first embodiment of the present invention.
Figure 7:
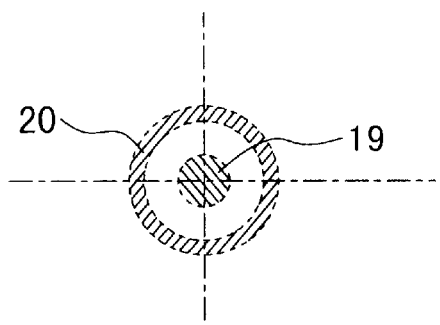
FIG. 7 is a sectional view taken along the line A—A in FIG. 6.

A description is now made of the construction of an injector with initial spraying, as a first example of the high-penetrating injector 17, which is employed in the direct fuel injection engine for use with this embodiment, with reference to FIGS. 5 to 7.

FIGS. 5A and 5B show the construction of the high-penetrating injector with initial spraying, which is employed in the direct fuel injection engine for use with the first embodiment of the present invention, in which FIG. 5A is a front view and FIG. 5B is an enlarged sectional view of a principal part of FIG. 5A. FIG. 6 is an explanatory view showing the pattern of a fuel spray formed by the high-penetrating injector with initial spraying, which is employed in the direct fuel injection engine for use with the first embodiment of the present invention. FIG. 7 is a sectional view taken along the line A—A in FIG. 6.

A nozzle portion 38 of the high-penetrating injector 17 with initial spraying mainly comprises a ball valve 23, a rod 24 connected to the ball valve 23, a swirler 25 for giving swirling force to a fuel spray, an injection port 31 formed in the nozzle portion 38, and an initial spray adjusting groove 28 for adjusting a proportion of an initial spray.

When the ball valve 23 is opened, fuel already stored in the initial spray adjusting groove 28, which is formed downstream of a swirl groove 27, is injected immediately after the valve opening, whereupon a lead spray 19 is formed as shown in FIGS. 6 and 7. Subsequently, the fuel flows into the swirl groove 27 through a fuel passage 26 to continue fuel injection while being subjected to the swirling force. Hence, as shown in FIGS. 6 and 7, an atomized ignition spray 20 is injected following the lead spray 19. Note that an internal mechanism for controlling the lift amount of the rod 24 with supply of power to a solenoid coil (not shown) is similar to that conventionally used in a general fuel injector.

The fuel spray injected from the high-penetrating injector 17 with initial spraying comprises, as shown in FIGS. 6 and 7, the lead spray 19 injected immediately after the start of the injection, and the ignition spray 20 injected following the lead spray 19.

As will be seen from the figures, the lead spray 19 is distributed at the center of the fuel spray at a ratio that is set to range from approximately 3 to 10% in distribution of the fuel spray in the radial direction perpendicular to the direction of fuel injection. The distance through which the spray penetrates is adjustable depending on the volume of the initial spray adjusting groove 28. The greater volume increases not only the ratio of the lead spray, but also the distance through which the spray penetrates.

A description is now made of the construction of an injector with deflected spraying, as a second example of the high-penetrating injector, which is employed in the direct fuel injection engine for use with this embodiment, with reference to FIGS. 8 to 11.

Figure 8:
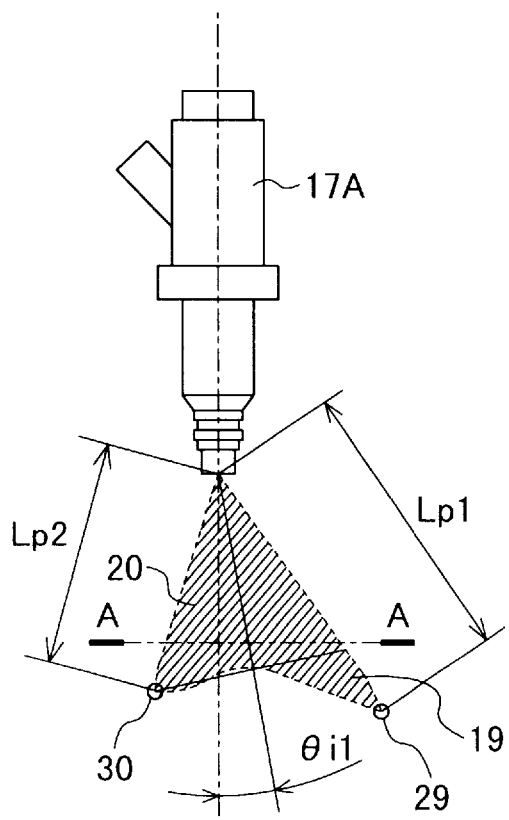
FIG. 8 is an explanatory view showing the pattern of a fuel spray formed by a high-penetrating injector with deflected spraying, which is employed in the direct fuel injection engine for use with the first embodiment of the present invention.
Figure 9:
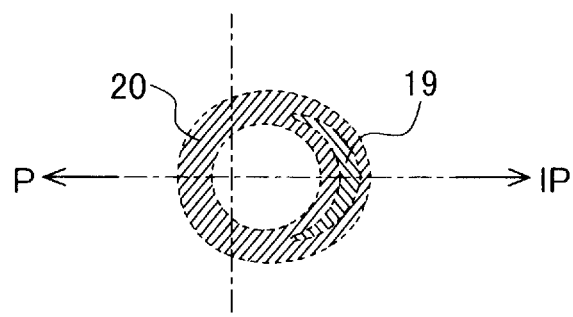
FIG. 9 is a sectional view taken along the line A—A in FIG. 8.
Figure 10:
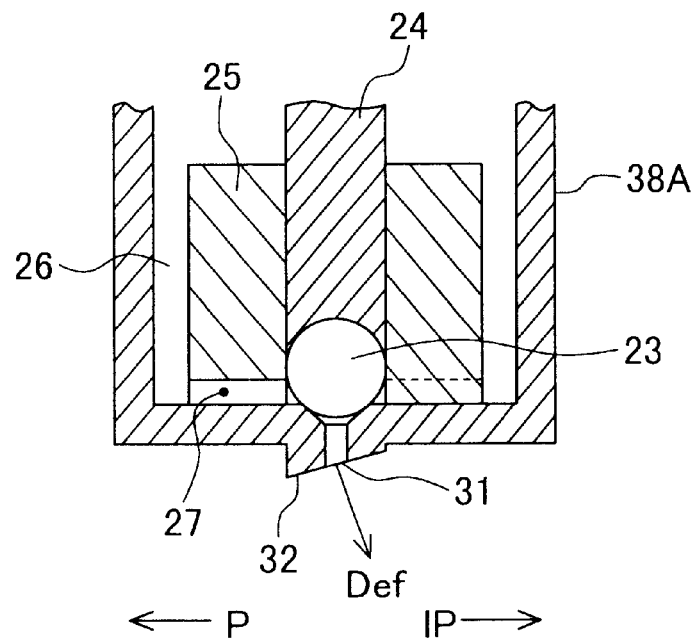
FIG. 10 is a sectional view showing the construction of a principal part of the high-penetrating injector with deflected spraying, which is employed in the direct fuel injection engine for use with the first embodiment of the present invention.
Figure 11:
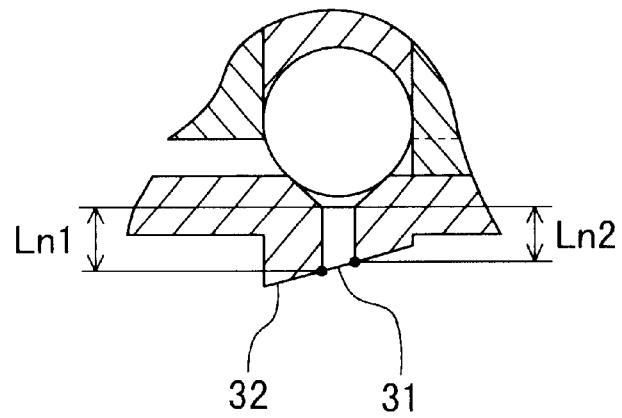
FIG. 11 is a partial enlarged sectional view of FIG. 10.

FIG. 8 is an explanatory view showing the pattern of a fuel spray formed by the high-penetrating injector with deflected spraying, which is employed in the direct fuel injection engine for use with the first embodiment of the present invention, and FIG. 9 is a sectional view taken along the line A—A in FIG. 8. FIG. 10 is a sectional view showing the construction of a principal part of the high-penetrating injector with deflected spraying, which is employed in the direct fuel injection engine for use with the first embodiment of the present invention, and FIG. 11 is a partial enlarged sectional view of FIG. 10. The same characters in FIGS. 8 to 11 as those in FIGS. 5 to 7 denote the same components.

A high-penetrating injector 17A shown in FIGS. 8 and 9 produces a fuel spray in the pattern based on deflected spraying. The fuel spray injected from the high-penetrating injector 17A with deflected spraying comprises a lead spray 19 injected in the direction IP toward the spark plug 18, and an ignition spray 20 injected in the direction P toward the piston.

The lead spray 19 has a longer penetrating distance.

In FIG. 8, Lp1 represents the length of a ridgeline formed by the lead spray 19, and Lp2 represents the length of a ridgeline formed by the ignition spray 20. Also, θi1 represents the deflection angle by which the direction of fuel injection is deflected from the axis of the high-penetrating injector 17A.

As shown in FIG. 10, an injection port 31 provided in a nozzle portion 38A has an end surface 32 inclined with respect to the axial direction of the high-penetrating injector 17A. Therefore, distances Ln1, Ln2 from a seat of the ball valve 23 to the nozzle end surface 32 around the injection port 31 are different from each other as shown in FIG. 11.

Since the distance Ln2 is shorter than the distance Ln1, swirling force given through a swirl groove 27 tends to keep a greater level of swirling energy on the side of the injection port 31 corresponding to the distance Ln2. Hence, the fuel injected from the Ln2 side of the nozzle end surface 32 forms a spray pattern deflected toward the Ln2 side while the injected fuel is atomized due to shearing force developed by the presence of an atmosphere. The deflecting direction $D_{EF}$ is aligned with the direction IP toward the spark plug. The larger a ratio of Lp1/Lp2, the greater is spray penetration and the longer is the distance through which the spray penetrates. The ratio of Lp1/Lp2 is set to about 1.2.

Figure 12:
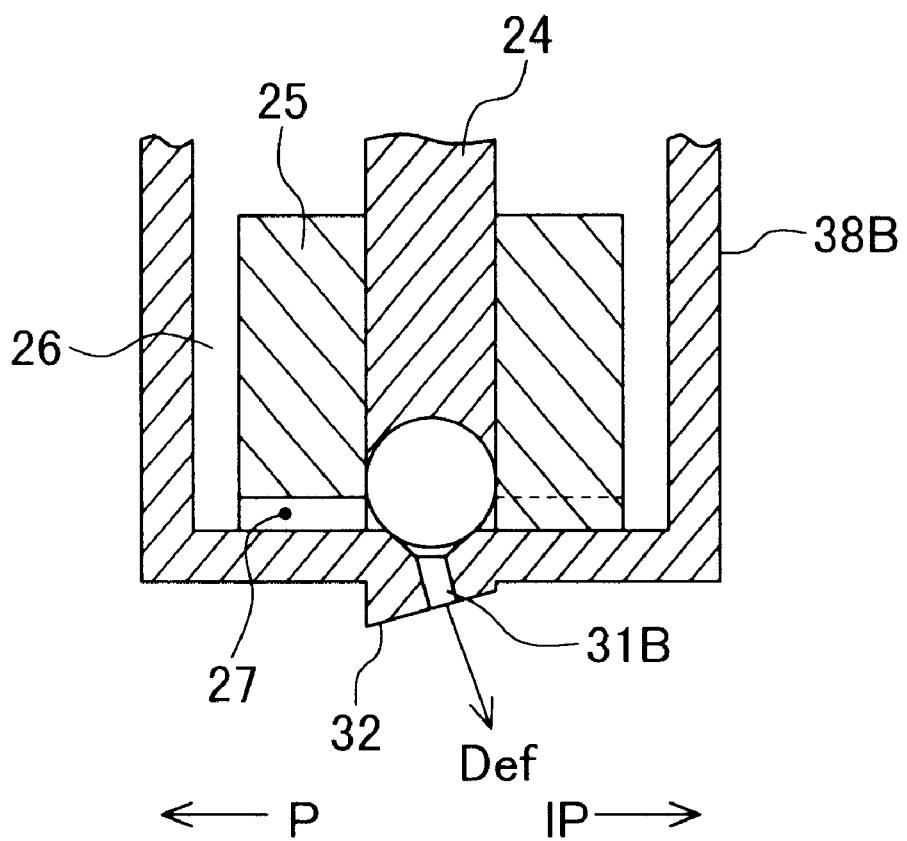
FIG. 12 is a sectional view showing the construction of a principal part of another example of the high-penetrating injector with deflected spraying, which is employed in the direct fuel injection engine for use with the first embodiment of the present invention.

A description is now made of the construction of an injector with deflected spraying, as a third example of the high-penetrating injector, which is employed in the direct fuel injection engine for use with this embodiment, with reference to FIG. 12.

FIG. 12 is a sectional view showing the construction of a principal part of another example of the high-penetrating injector with deflected spraying, which is employed in the direct fuel injection engine for use with the first embodiment of the present invention. The same characters in FIG. 12 as those in FIG. 10 denote the same components.

In this example, an injection port 31B formed at a distal end of a nozzle portion 38B is inclined with respect to the axial direction of the high-penetrating injector 17A.

Figure 13:
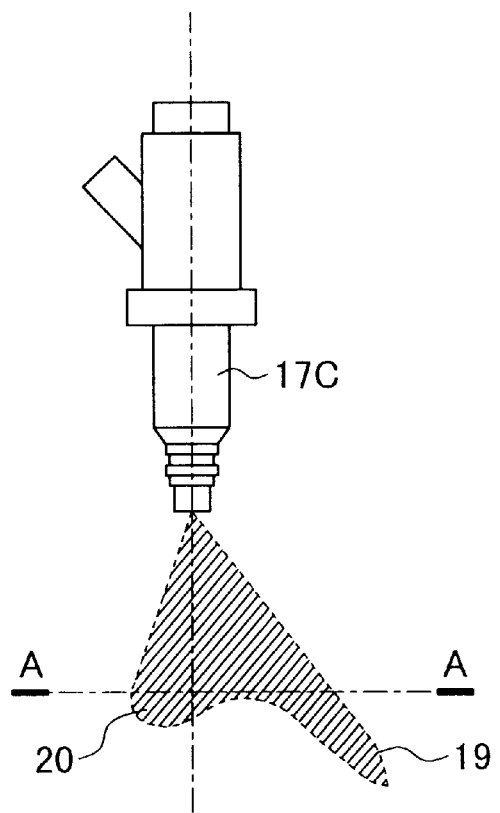
FIG. 13 is an explanatory view showing the pattern of a fuel spray formed by a high-penetrating injector of the spray lead type, which is employed in the direct fuel injection engine for use with the first embodiment of the present invention.
Figure 14:
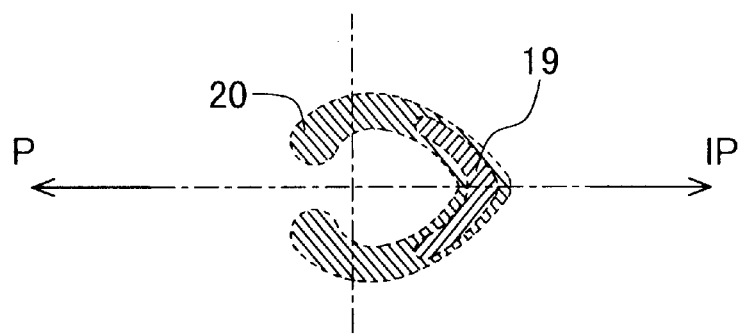
FIG. 14 is a sectional view taken along the line A—A in FIG. 13.

A description is now made of the construction of an injector of the spray lead type, as a fourth example of the high-penetrating injector, which is employed in the direct fuel injection engine for use with this embodiment, with reference to FIGS. 13 to 15.

Figure 15A:
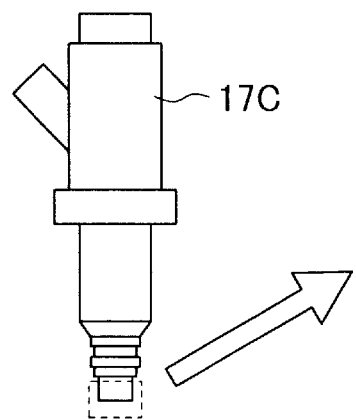
Figure 15B:
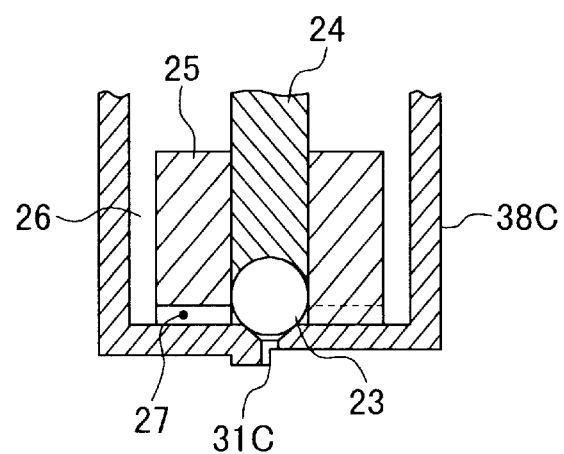
Figure 15C:
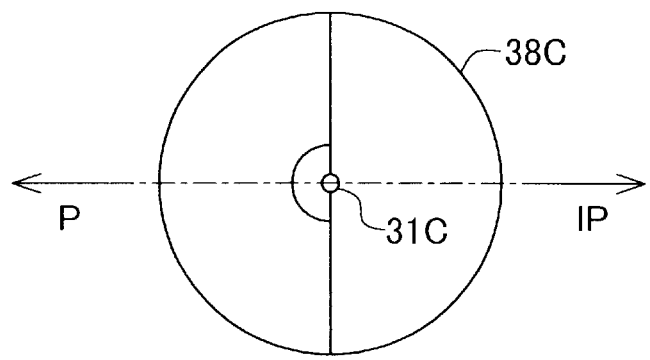

FIG. 13 is an explanatory-view showing the pattern of a fuel spray formed by the high-penetrating injector of the spray lead type, which is employed in the direct fuel injection engine for use with the first embodiment of the present invention. FIG. 14 is a sectional view taken along the line A—A in FIG. 13. FIGS. 15A, 15B and 15C are explanatory views showing the construction of the high-penetrating injector of the spray lead type, which is employed in the direct fuel injection engine for use with the first embodiment of the present invention, in which FIG. 15A is a front view, FIG. 15B is an enlarged sectional view of a principal part of FIG. 15A, and FIG. 15C is a bottom view of the principal part of FIG. 15B. The same characters in FIGS. 13 to 15 as those in FIGS. 5 to 7 denote the same components.

A fuel spray injected from a high-penetrating injector 17C comprises a lead spray 19 injected in the direction IP toward the spark plug 18, and an ignition spray 20 injected in the direction P toward the piston. The fuel spray has a spray lead pattern in a combination of both the lead spray 19 and the ignition spray 20. Particularly, as shown in the sectional view of FIG. 14 taken along the line XIV—XIV in FIG. 13, the pattern of the fuel spray is featured in that a gap is partly formed in the ignition spray 20 on the side opposite to the lead spray 19. Also, the lead spray 19 directing toward the spark plug 18 has a higher flow density than the ignition spray 20. The distance through which the lead spray 19 penetrates is therefore longer than that through which the ignition spray 20 penetrates.

As shown in FIG. 15, an injection port 31C of a nozzle portion 38C is cut to one-sidedly face in the direction IP toward the spark plug. Specifically, a nozzle end wall defining the injection port 31C is cut out substantially half so that a nozzle end surface has a stepped shape. A gap is thus partly formed in the contour of the fuel spray based on the fact that shearing force developed between the injected fuel and the atmosphere differs in the circumferential direction. With such an arrangement, the penetration of the lead spray in the direction toward the spark plug is increased, whereby the fuel spray can be carried to the spark plug and the operation with stratified charge combustion can be performed even in the range of high revolution speed. As a result, it is possible to suppress mixing of burned gas and fresh air to maintain the combustion stability, accelerate vaporization of sprayed fuel at the beginning of fuel injection to reduce the emission rate of HC, and to realize a reduction of NOx based on the effect of exhaust return.

Proximate twice injection control performed by the control system for the direct fuel injection engine according to this embodiment will be described below with reference to FIGS. 16 and 17.

Figure 16:
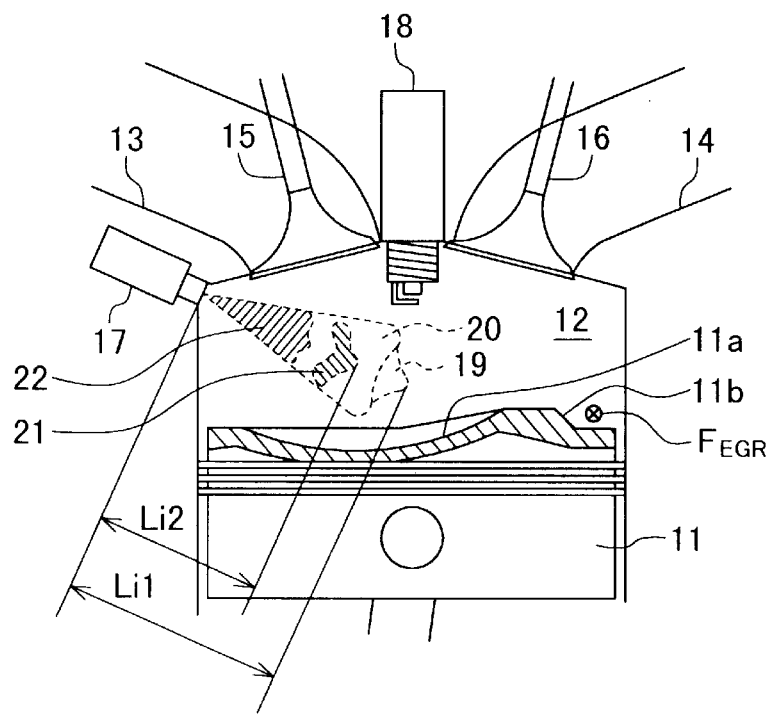
FIG. 16 is an explanatory view showing the state of fuel injection during the compression stroke in the operation with stratified charge combustion under proximate twice injection control performed by the control system for the direct fuel injection engine according to the first embodiment of the present invention.

FIG. 16 is an explanatory view showing the state of fuel injection during the compression stroke in the operation with stratified charge combustion under proximate twice injection control performed by the control system for the direct fuel injection engine according to the first embodiment of the present invention. FIG. 17 is an explanatory view showing the state of fuel injection before reaching the compression top dead center in the operation with stratified charge combustion under proximate twice injection control performed by the control system for the direct fuel injection engine according to the first embodiment of the present invention. The same characters in FIGS. 16 and 17 as those in FIGS. 1 to 4 denote the same components.

As mentioned above, the high-penetrating injector used in this embodiment is an injector having high penetration. If the spray pattern remains suitable for the range of high revolution speed, the injected fuel spray is moved so fast that the fuel spray reaches the cylinder wall on the exhaust side in the range of low revolution speed, thus resulting in an increased emission rate of HC. Also, contact of the fuel spray with the cylinder wall increases the discharge rate of smoke in the range of low revolution speed, thereby narrowing the operating range in which the operation with stratified charge combustion is feasible. To overcome those problems, fuel is injected twice at a proximate interval during the compression stroke.

In this embodiment, the control unit 7 controls the fuel injector 17 so that fuel is injected in a required amount once in the range of high revolution speed (e.g., 3200 r/min). In this case of once injection, as indicated by broken lines in FIG. 16, a fuel spray is injected in such a pattern that a lead spray 19 injected at the beginning of fuel injection goes ahead, and an ignition spray 20 follows the lead spray 19. Li1 represents the distance through which the fuel spray penetrates immediately after the injection.

Upon determining that the operating status has changed and shifted to the range of low revolution speed (e.g., 600 r/min), the control unit 7 controls the fuel injector 17 to inject fuel twice, i.e., in a pattern divided into a first spray 21 and a second spray 22, for suppressing the penetration of a fuel spray. By injecting fuel twice instead of the once injection, the spray speed is reduced by the atmosphere in the cylinder. As a result, the distance through which the fuel spray penetrates in the twice injection is represented by Li2 that is shorter than the distance Li1 through which the fuel spray penetrates in the once injection.

Incidentally, by setting an injection interval between the first spray 21 and the second spray 22 to a very short time, vaporization of the sprayed fuel is accelerated during the compression stroke, and air-fuel mixtures produced by twice injection are distributed in a continuous pattern. Therefore, the twice injection provide neither troubles in flame propagation nor adverse effects upon the combustion stability.

Figure 17:
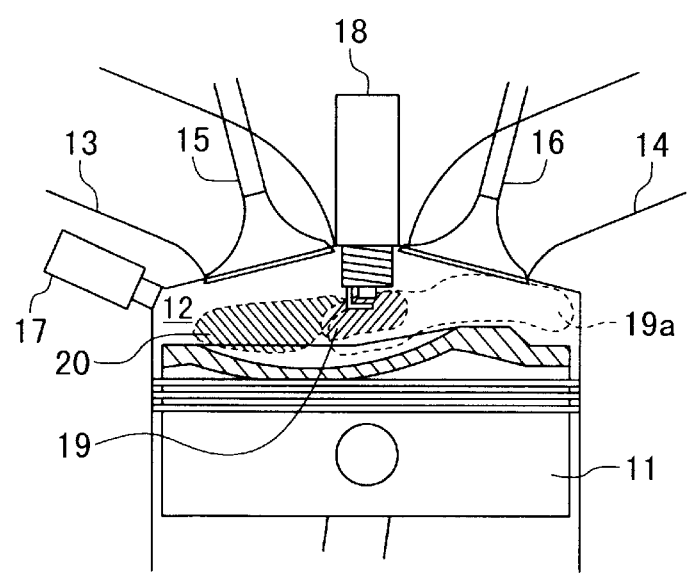
FIG. 17 is an explanatory view showing the state of fuel injection before reaching the compression top dead center in the operation with stratified charge combustion under proximate twice injection control performed by the control system for the direct fuel injection engine according to the first embodiment of the present invention.

FIG. 17 shows the state in which the piston further approaches the compression top dead center from the state shown in FIG. 16. In FIG. 17, a dotted line 19a represents a distribution of the air-fuel mixture that is produced by the once injection and can be ignited. In the once injection, the fuel spray is moved so fast that, at the time when the lead spray 19 reaches the spark plug 18, the sprayed fuel is not yet vaporized enough to ignite. Then, when the piston further approaches the compression top dead center and the vaporization is progressed into an ignitable state with the lapse of time, the whole of the fuel spray has almost passed by the spark plug 18. Therefore, the ignition timing comes closer to the top dead center and the combustion period is shortened, which is disadvantageous in reducing HC.

On the other hand, in the twice injection, the air-fuel mixture is slowly moved and ignition can be started with the lead spray 19. Therefore, the ignition timing is advanced and a sufficient combustion period can be obtained, whereby a reduction of HC can be achieved.

With this embodiment, as described above, the high-penetrating injector is employed to effectuate the stratified charge combustion in the range of medium and high revolution speeds. In the operation at low revolution speed and under low load, the valve overlap is enlarged to increase the amount of introduced burned gas for the purpose of the internal EGR. At that time, valve varying control is made to produce a phase difference in the opening timing between two intake valves, thereby forming a weak swirl flow inside the combustion chamber along the cylinder wall. The weak swirl flow functions to keep the EGR gas from spreading, and to form an EGR gas area in a space near the cylinder wall on the side opposite to the injector. Even under low and medium load, therefore, fuel vaporization of the lead spray can be effectively realized and the stratified charge combustion can be performed with stability. It is thus possible to suppress mixing of burned gas and fresh air to maintain the combustion stability, accelerate vaporization of sprayed fuel at the beginning of fuel injection to reduce the emission rate of HC, and to realize a reduction of NOx based on the effectuate of exhaust return. Further, the proximate twice injection performed in the range of low revolution speed makes it possible to hold down the penetration of the fuel spray, reduce the amount of HC generated, and to widen the range in which the operation with stratified charge combustion is feasible.

The construction and operation of a control system for a direct fuel injection engine according to a second embodiment of the present invention will be described below with reference to FIG. 18. The overall construction of the direct fuel injection engine in this embodiment is similar to that shown in FIG. 1.

Figure 18:
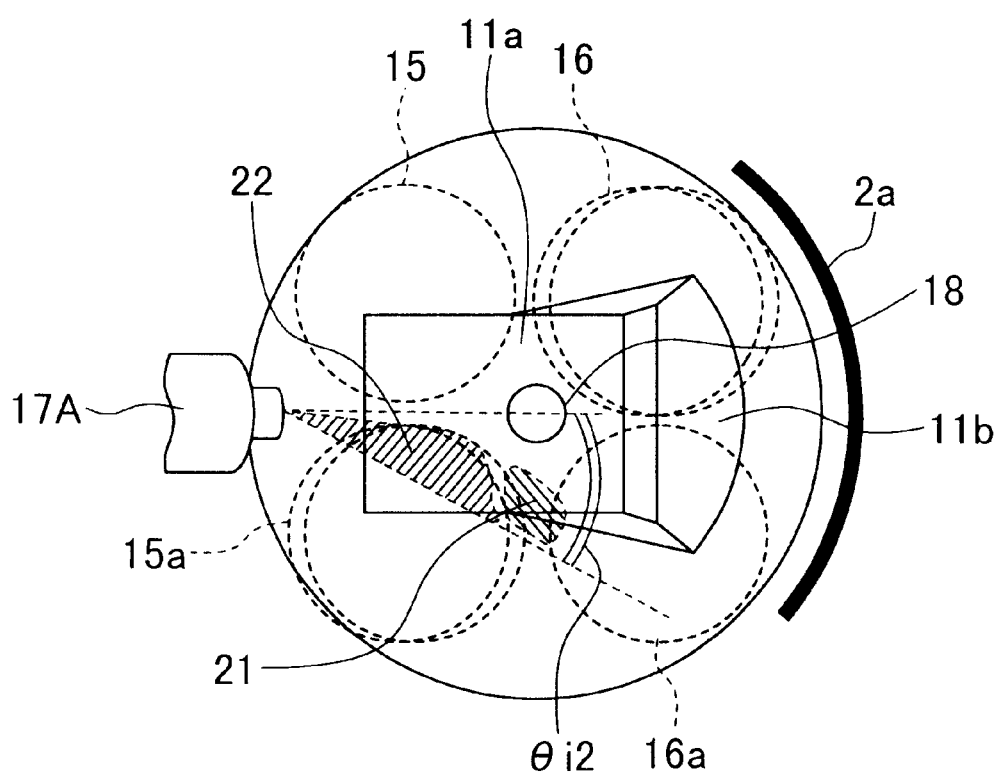
FIG. 18 is a plan view of a cylinder of a direct fuel injection engine for use with a second embodiment of the present invention.

FIG. 18 is a plan view of a cylinder of the direct fuel injection engine for use with the second embodiment of the present invention. The same characters in FIG. 18 as those in FIGS. 1 and 2 denote the same components.

A high-penetrating injector employed in this embodiment is the same as the high-penetrating injector 17A with deflected spraying, which has been described above in connection with FIG. 8. Alternatively, the high-penetrating injector 17C of the spray lead type, shown in FIG. 13, may be used instead. In an illustrated example, a fuel spray injected from the injector 17A comprises a first spray 21 and a second spray 22. The fuel spray is injected at a deflection angle $\theta i2$ with respect to the direction toward the spark plug 18.

The control unit controls the opening timing of the intake valves 15 and 15a to provide a phase difference in the opening timing between the intake valves. The injected fuel spray is deflected so as to ride on a swirl flow produced with the phase difference in the opening timing between the two left and right intake valves. As a result, the fuel spray is directed toward the cylinder wall 2a on the exhaust side which is heated to higher temperature by the EGR gas, whereby fuel vaporization of the first spray 21 is accelerated.

With this embodiment, as described above, it is also possible to suppress mixing of burned gas and fresh air to maintain the combustion stability, accelerate vaporization of sprayed fuel at the beginning of fuel injection to reduce the emission rate of HC, and to realize a reduction of NOx based on the effect of exhaust return.

The construction and operation of a control system for a direct fuel injection engine according to a third embodiment of the present invention will be described below with reference to FIGS. 19 and 20. The overall construction of the direct fuel injection engine in this embodiment is similar to that shown in FIG. 1.

Figure 19:
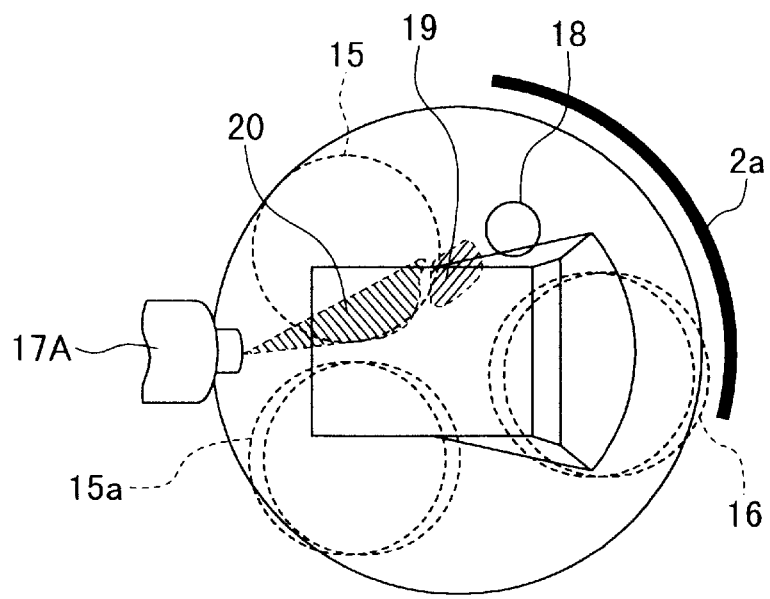
FIG. 19 is a plan view of a cylinder of a direct fuel injection engine for use with a third embodiment of the present invention.
Figure 20:
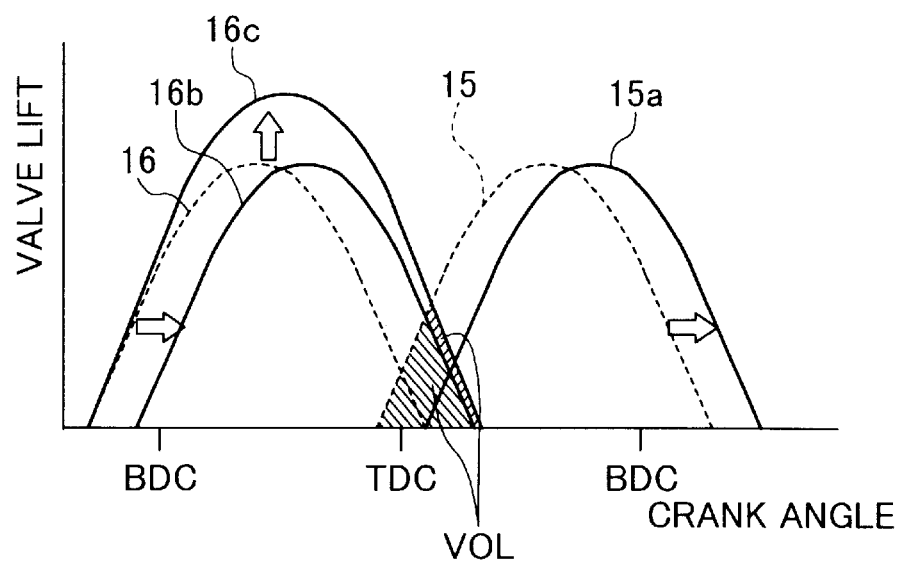
FIG. 20 is a chart for explaining the valve timing of intake and exhaust valves controlled by a control system for the direct fuel injection engine according to the third embodiment of the present invention.

FIG. 19 is a plan view of a cylinder of the direct fuel injection engine for use with the third embodiment of the present invention, and FIG. 20 is a chart for explaining the valve timing of intake and exhaust valves controlled by the control system for the direct fuel injection engine according to the third embodiment of the present invention. The same characters in FIGS. 19 and 20 as those in FIGS. 1 and 2 denote the same components.

In this embodiment, as shown in FIG. 19, the direct fuel injection engine is constituted by a cylinder provided with three valves, i.e., two intake valves 15, 15a and one exhaust valve 16. In the cylinder provided with three valves, the position of the ignition plug 18 is slightly offset from the cylinder center, and therefore the lead spray 19 is injected at a deflection angle so as to direct toward the ignition plug side. A fuel injector may be the high-penetrating injector 17A with deflected spraying, shown in FIG. 8, or the high-penetrating injector 17C of the spray lead type, shown in FIG. 13.

When effectuating the internal EGR in the range of low revolution speed, as shown in FIG. 20, the opening timing of the intake valve 15a is delayed with respect to the opening timing of the intake valve 15 to provide a phase difference in the opening timing between the two left and right intake valves. Also, an exhaust valve varying driver for the exhaust valve 16 is operated to delay the opening timing of the exhaust valve 16, as indicated by 16b, with respect to the usual opening timing thereof. A valve overlap between the intake valve 15 and the exhaust valve 16 is thereby enlarged to increase the internal EGR. Further, providing the phase difference in the opening timing between the two left and right intake valves generates a weak swirl flow in the combustion chamber. Additionally, as shown in FIG. 19, in the range of low revolution speed, fuel is injected from the injector 17A by proximate twice injection in a pattern comprising a first spray 19 and a second spray 20.

Instead of delaying the opening timing of the exhaust valve 16, the exhaust valve 16 may be controlled to increase its valve lift, as indicated by 16c, for supplying the amount of EGR gas introduced. Alternatively, control may be performed to delay the opening timing of the exhaust valve and to increase the valve lift thereof at the same time.

With this embodiment, as described above, it is also possible to suppress mixing of burned gas and fresh air to maintain the combustion stability, accelerate vaporization of sprayed fuel at the beginning of fuel injection to reduce the emission rate of HC, and to realize a reduction of NOx based on the effect of exhaust return.

The construction and operation of a control system for a direct fuel injection engine according to a fourth embodiment of the present invention will be described below with reference to FIGS. 21A and 21B. The overall construction of the direct fuel injection engine in this embodiment is similar to that shown in FIGS. 1 and 2.

Figure 21A:
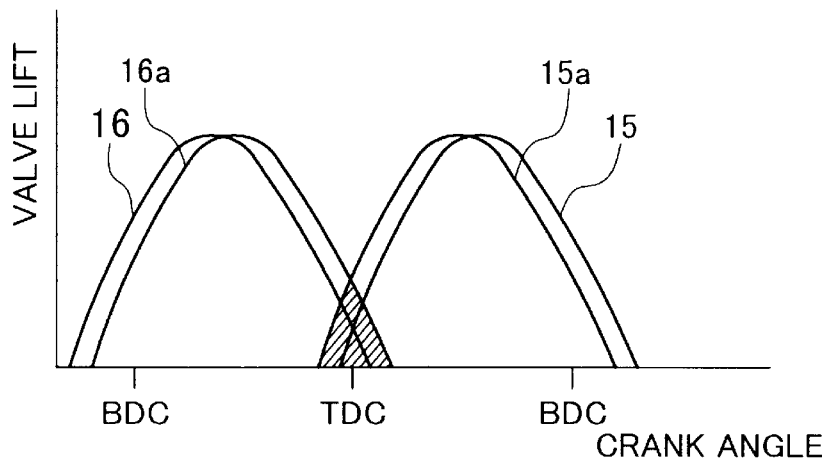
FIGS. 21A and 21B are each a chart for explaining the valve timing of intake and exhaust valves controlled by a control system for a direct fuel injection engine according to a fourth embodiment of the present invention.
Figure 21B:
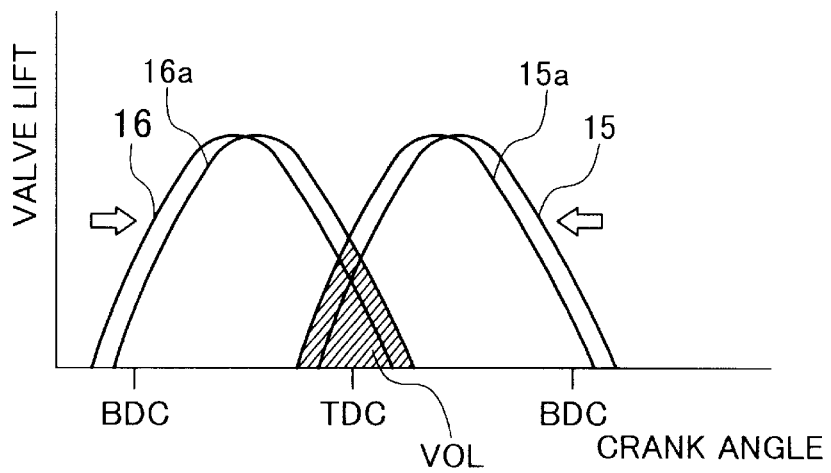

FIGS. 21A and 21B are each a chart for explaining the valve timing of intake and exhaust valves controlled by the control system for the direct fuel injection engine according to the fourth embodiment of the present invention. FIG. 21A represents the valve timing in the range of high revolution speed, and FIG. 21B represents the valve timing in the range of low revolution speed. The same characters in FIGS. 21A and 21B as those in FIGS. 1 to 3 denote the same components.

As shown in FIG. 21A, a phase difference of about 10° as converted in terms of crank angle is provided beforehand in the opening timing between two left and right intake valves 15, 15a. Also, a phase difference of about 10° as converted in terms of crank angle is provided beforehand in the opening timing between two left and right intake valves 16, 16a.

In the range of low revolution speed, as shown in FIG. 21B, the closing timing of each exhaust valve 16, 16a is delayed and the opening timing of each intake valve 15, 15a is advanced, whereby a valve overlap VOL between the intake valve and the exhaust valve is enlarged to effectuate the internal EGR. An arrangement of the intake valve and the exhaust valve to provide the valve overlap between them may be determined in consideration of both the direction of a swirl flow to be intensified in the range of low revolution speed and the injecting direction of the fuel injector. Thus, the valve arrangement in this embodiment is not limited to a particular one.

A valve opening mechanism for each of the intake valves 15, 15a and the exhaust valves 16, 16a may be constructed as described above in connection with FIG. 1. In other words, the intake valves and the exhaust valves may be connected respectively to the intake and exhaust camshafts 3, 5 and the intake and exhaust valve varying drivers 4, 6, which are provided independently of each other. However, since the phase difference in the opening timing is fixedly set beforehand between the left and right intake valves and between the left and right exhaust valves, the valve varying mechanism may be of the structure twisting a cam shaft. That structure requires one valve varying mechanism for each pair of the intake valves and the exhaust valves, and is simpler than that of the mechanism for variably controlling the phase difference between the two left and right valves. Accordingly, the valve moving mechanism can be improved in durability and reduced in weight. Further, upon a shift from the range of high revolution speed to the range of low revolution speed, the valve overlap can be continuously increased and the control can be made in consideration of the combustion stability. As a result, the internal EGR can be produced with higher robustness.

With this embodiment, as described above, it is also possible to suppress mixing of burned gas and fresh air to maintain the combustion stability, accelerate vaporization of sprayed fuel at the beginning of fuel injection to reduce the emission rate of HC, and to realize a reduction of NOx based on the effect of exhaust return.

The construction and operation of a control system for a direct fuel injection engine according to a fifth embodiment of the present invention will be described below with reference to FIG. 22. The overall construction of the direct fuel injection engine in this embodiment is similar to that shown in FIGS. 1 and 2.

Figure 22:
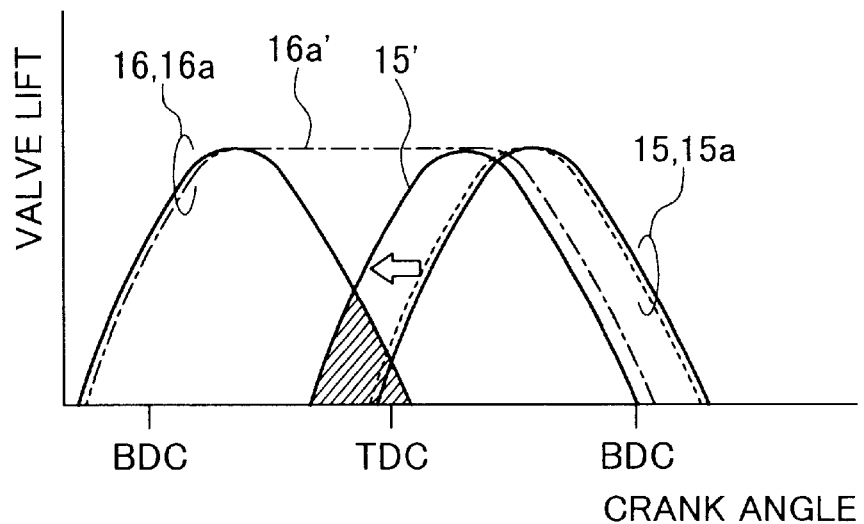
FIG. 22 is a chart for explaining the valve timing of intake and exhaust valves controlled by a control system for a direct fuel injection engine according to a fifth embodiment of the present invention.

FIG. 22 is a chart for explaining the valve timing of intake and exhaust valves controlled by a control system for a direct fuel injection engine according to a fifth embodiment of the present invention. The same characters in FIG. 22 as those in FIGS. 1 to 3 denote the same components.

While, in the embodiment shown in FIG. 3, the opening timings of the intake valve 15a and the exhaust valve 16a are delayed simultaneously, the valve opeining timing is controlled in two stages in this embodiment.

Usually, the intake valves 15, 15a and the exhaust valves 16, 16a are controlled by the control unit 7 to open and close at the timings indicated by respective characters. When effectuating the internal EGR, the control unit 7 advances only the opening timing of one intake valve 15, as indicated by 15', in the first stage without delaying the closing timings of the exhaust valves.

During the first stage, the control unit 7 determines the effect of the internal EGR upon the combustion stability. When the control unit 7 determines that the combustion stability can be maintained even if the amount of introduced EGR gas is further increased, it controls in the second stage one exhaust valve 16a to be held open, as indicated by 16a', during a period in which the intake valves 15', 15a are opened, thereby increasing the internal EGR. A method for determining the combustion stability prior to a shift to the second stage can be implemented by detecting variations in rotation or changes in angular speed of the ring gear with the rotation sensor 9, and referring to a control map that is set beforehand by a rotation variation detecting program installed in the control unit 7. Since the shift to the second stage is allowed only when the permission has been confirmed as a result of the above determination, there is no risk of impairing the combustion stability.

With this embodiment, as described above, it is also possible to suppress mixing of burned gas and fresh air to maintain the combustion stability, accelerate vaporization of sprayed fuel at the beginning of fuel injection to reduce the emission rate of HC, and to realize a reduction of NOx based on the effect of exhaust return.

The construction and operation of a control system for a direct fuel injection engine according to a sixth embodiment of the present invention will be described below with reference to FIG. 23. The overall construction of the direct fuel injection engine in this embodiment is similar to that shown in FIGS. 1 and 2.

Figure 23:
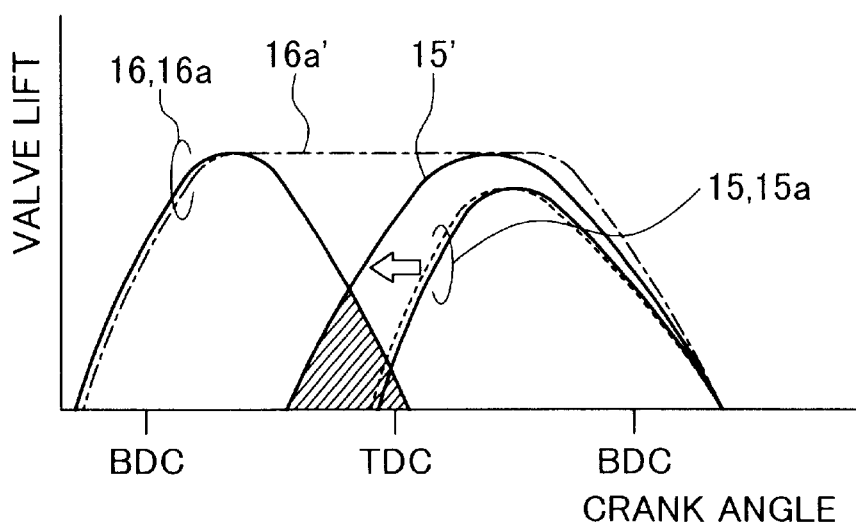
FIG. 23 is a chart for explaining the valve timing of intake and exhaust valves controlled by a control system for a direct fuel injection engine according to a sixth embodiment of the present invention.

FIG. 23 is a chart for explaining the valve timing of intake and exhaust valves controlled by a control system for a direct fuel injection engine according to the sixth embodiment of the present invention. The same characters in FIG. 23 as those in FIGS. 1 to 3 denote the same components.

While, in the embodiment shown in FIG. 3, the opening timings of the intake valve 15a and the exhaust valve 16a are delayed simultaneously, the valve opening timing is controlled in two stages in this embodiment.

Usually, the intake valves 15, 15a and the exhaust valves 16, 16a are controlled by the control unit 7 to open and close at the timings indicated by respective characters. When effectuating the internal EGR, the control unit 7 advances only the opening timing of one intake valve 15, as indicated by 15', in the first stage without delaying the closing timings of the exhaust valves. At that time, the closing times of the two left and right intake valves 15' 15a are kept the same unlike the fifth embodiment shown in FIG. 22.

During the first stage, the control unit 7 determines the effect of the internal EGR upon the combustion stability. When the control unit 7 determines that the combustion stability can be maintained even if the amount of introduced EGR gas is further increased, it controls in the second stage one exhaust valve 16a to be held open, as indicated by 16a', during a period in which the intake valves 15', 15a are opened, thereby increasing the internal EGR. A method for determining the combustion stability prior to a shift to the second stage can be implemented by detecting variations in rotation or changes in angular speed of the ring gear with the rotation sensor 9, and referring to a control map that is set beforehand by a rotation variation detecting program installed in the control unit 7. Since the shift to the second stage is allowed only when the permission has been confirmed as a result of the above determination, there is no risk of impairing the combustion stability.

With this embodiment, as described above, it is also possible to suppress mixing of burned gas and fresh air to maintain the combustion stability, accelerate vaporization of sprayed fuel at the beginning of fuel injection to reduce the emission rate of HC, and to realize a reduction of NOx based on the effect of exhaust return.

As described above, according to the present invention, mixing of burned gas and fresh air can be suppressed, and therefore the combustion stability can be maintained. Vaporization of sprayed fuel at the beginning of fuel injection can be accelerated, and therefore the emission rate of HC can be reduced. Further, a reduction of NOx can be realized based on the effect of exhaust return.

What is claimed is:

1. A control system for a direct fuel injection engine having a plurality of cylinders, comprising a fuel injector for directly injecting fuel into a combustion chamber of each of the cylinders, and valve varying mechanism configured to variably control the opening/closing timing of each of an intake valve system and/or an exhaust valve system of each of the cylinders, said valve varying mechanism being operable to introduce burned gas from an exhaust port into each said combustion chamber and to injection into each combustion chamber the fuel during a compression stroke for effectuating stratified charge combustion therein, wherein:

said valve varying mechanism is controlled to provide a phase difference in the opening or closing timing in at least one stage of one or more valves constituting said intake valve system and/or of said exhaust valve system, which systems comprise at least three of the valves, thereby generating a flow of the burned gas along a cylinder wall.

2. A control system for a direct fuel injection engine according to claim 1, wherein said valve varying mechanism is configured to control a valve overlap between said intake valve system and said exhaust valve system by varying the opening/closing timing of one of the two valves constituting said intake valve system, and/or varying the opening/closing timing of one of the two valves constituting said exhaust valve system.

3. A control system for a direct fuel injection engine according to claim 1, wherein said valve varying mechanism is configured to control a valve overlap between said intake valve system and said exhaust valve system by providing a phase difference in the opening timing between the two valves constituting said intake valve system beforehand, providing a phase difference in the opening timing between the two valves constituting said exhaust valve system beforehand, and varying the opening/closing timing of said intake valve system and said exhaust valve system.

4. A control system for a direct fuel injection engine according to claim 1, wherein said valve varying mechanism is configured to vary the opening/closing timing of one of the two valves constituting said intake valve system to increase a valve overlap between said intake valve system and said exhaust valve system, and to then hold one of the two valves constituting said exhaust valve system open during a period in which said intake valve system is opened, thereby increasing the amount of burned gas introduced.

5. A control system for a direct fuel injection engine according to claim 1, wherein a valve overlap between said intake valve system and said exhaust valve system is controlled by varying the opening/closing timing of one of the two valves constituting said intake valve system, and/or increasing a valve lift of said exhaust valve system.

6. A control system for a direct fuel injection engine according to claim 1, wherein said fuel injector is a high-penetrating injector for injecting the fuel in a spray form with initial spraying or deflected spraying or spray-lead spraying.

7. A control system for a direct fuel injection engine according to claim 6, wherein said fuel injector injects the fuel twice in the operation with stratified charge combustion.

8. A control system for a direct fuel injection engine according to claim 1, further comprising a piston having a recess formed in a crown surface of said piston to maintain a tumble flow during the compression stroke, and having a swirl guide formed therein on the exhaust side opposite to said recess.

9. A control system for a direct fuel injection engine according to claim 1, wherein the injecting direction of said fuel injector is aligned with the direction of the burned gas flow along the cylinder wall.

* * * * *